(12) United States Patent
Matsuoka

(10) Patent No.: US 10,122,939 B2
(45) Date of Patent: Nov. 6, 2018

(54) IMAGE PROCESSING DEVICE FOR PROCESSING IMAGE DATA AND MAP DATA WITH REGARD TO DEPTH DISTRIBUTION OF A SUBJECT, IMAGE PROCESSING SYSTEM, IMAGING APPARATUS, IMAGE PROCESSING METHOD, AND RECORDING MEDIUM

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/189,145

(22) Filed: Jun. 22, 2016

(65) Prior Publication Data

US 2016/0381305 A1 Dec. 29, 2016

(30) Foreign Application Priority Data

Jun. 26, 2015 (JP) .................................. 2015-128534

(51) Int. Cl.
*H04N 5/262* (2006.01)
*G06T 5/00* (2006.01)
*H04N 5/222* (2006.01)
*H04N 19/60* (2014.01)
*G06T 7/571* (2017.01)

(52) U.S. Cl.
CPC ........... *H04N 5/2621* (2013.01); *G06T 5/002* (2013.01); *G06T 7/571* (2017.01); *H04N 5/2226* (2013.01); *H04N 19/60* (2014.11); *G06T 2200/21* (2013.01)

(58) Field of Classification Search
CPC .............................. H04W 72/042; H04L 5/00
See application file for complete search history.

(56) References Cited

U.S. PATENT DOCUMENTS

| | | | | |
|---|---|---|---|---|
| 7,589,771 B2* | 9/2009 | Hosaka | ................... | H04N 5/217 348/252 |
| 8,482,654 B2* | 7/2013 | Lipton | ............... | H04N 13/0022 348/340 |
| 8,917,316 B2* | 12/2014 | Nonaka | .............. | H04N 5/23293 348/46 |
| 2015/0116353 A1* | 4/2015 | Miura | ..................... | G06T 11/60 345/632 |
| 2015/0189329 A1* | 7/2015 | Wada | ..................... | H04N 19/59 382/199 |

FOREIGN PATENT DOCUMENTS

JP 2014-112748 A 6/2014

* cited by examiner

*Primary Examiner* — Padma Haliyur
(74) *Attorney, Agent, or Firm* — Cowan, Liebowitz & Latman, P.C.

(57) ABSTRACT

An image processing device processes image data and map data with regard to depth distribution of subjects. A decoding unit decodes encoded image data obtained by encoding image data of a subject image, and thereby generates decoded image data. Another decoding unit decodes encoded map data obtained by encoding map data and thereby generates decoded map data. A defocus map shaping unit acquires decoded image data and decoded map data, performs a shaping process of the decoded map data with reference to the decoded image data, and thereby generates shaped map data. A background blurring unit refers to the shaped map data and performs image processing of adding blur to a background of the decoded image.

25 Claims, 9 Drawing Sheets

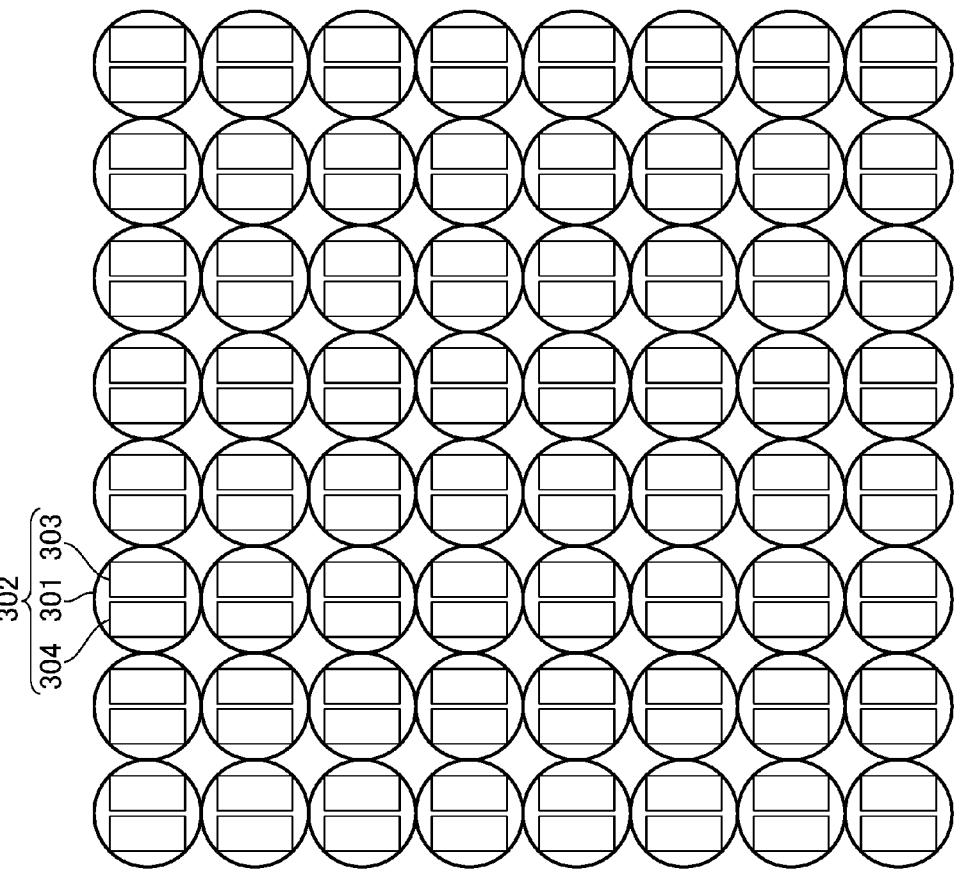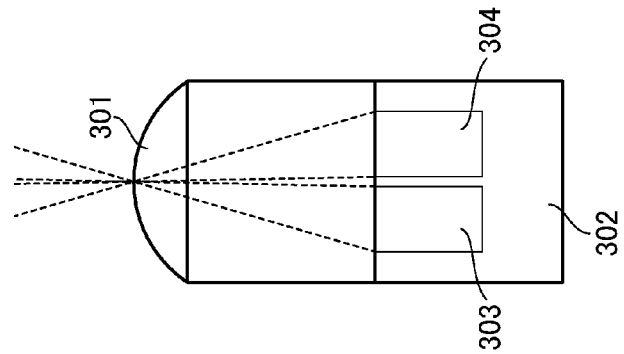

IMAGE PROCESSING DEVICE FOR PROCESSING IMAGE DATA AND MAP DATA WITH REGARD TO DEPTH DISTRIBUTION OF A SUBJECT, IMAGE PROCESSING SYSTEM, IMAGING APPARATUS, IMAGE PROCESSING METHOD, AND RECORDING MEDIUM

BACKGROUND OF THE INVENTION

Field of the Invention

The present invention relates to an image processing technology for processing information of distance distribution of a subject.

Description of the Related Art

There are imaging apparatus that can record distance information of subjects along with image data. For example, Japanese Patent Laid-Open No. 2014-112748 discloses a technology of encoding image data and a distance image to be compressed and recording them.

However, in the related technology disclosed in Japanese Patent Laid-Open No. 2014-112748, there are possibilities of the data of the contour portion of a subject on a distance map deteriorating when the data is encoded and the accuracy of the distance map deteriorating after it is decoded.

SUMMARY OF THE INVENTION

The present invention aims to reduce the influence of encoding of information with regard to distance distribution of a subject on image processing.

An image processing device according to an embodiment of the present invention is an image processing device that processes image data and map data regarding depth distribution of a subject, and has a first decoding unit configured to decode the image data that has been encoded and thereby generate decoded image data, a second decoding unit configured to decode the map data that has been encoded and thereby generate decoded map data, a first shaping unit configured to acquire the decoded image data and the decoded map data and perform a shaping process of the decoded map data with reference to the decoded image data, and a first image processing unit configured to perform image processing of the decoded image data with reference to the decoded map data that has been processed for shaping by the first shaping unit.

Further features of the present invention will become apparent from the following description of exemplary embodiments with reference to the attached drawings.

BRIEF DESCRIPTION OF THE DRAWINGS

FIGS. 3A and 3B are diagrams for describing an imaging unit of the imaging apparatus according to an embodiment of the present invention.

DESCRIPTION OF THE EMBODIMENTS

Exemplary embodiments of the present invention will be described in detail below with reference to the drawings. In each embodiment, an image processing system constituted by an RGB-D camera and an image processing device is exemplified. Application Examples with regard to a digital camera that is an example of an RGB-D camera and a personal computer (hereinafter abbreviated to a PC) that is an example of an image processing device will be described. In this case, the digital camera functions as an encoding device of image data and distance map data, and the PC functions as a decoding device.

First Embodiment

Figure 1:
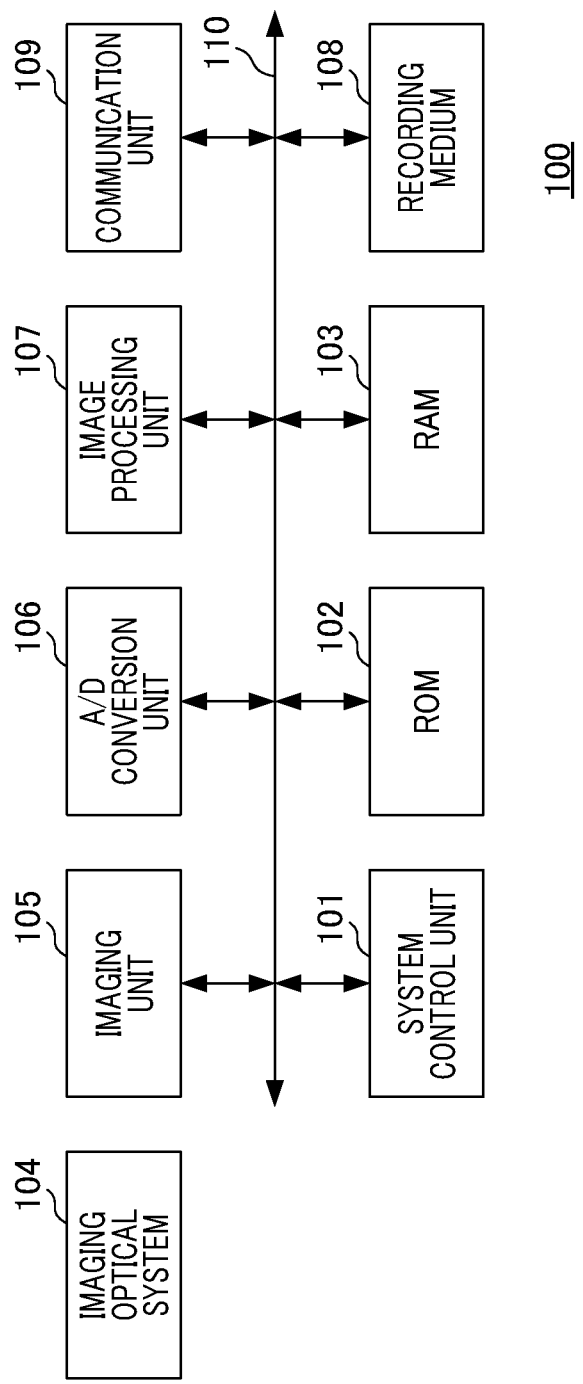
FIG. 1 is a block diagram showing a functional configuration example of an imaging apparatus according to an embodiment of the present invention.

FIG. 1 is a block diagram exemplifying a functional configuration of the digital camera according to the present embodiment. Constituent parts thereof can transmit and receive data to and from each other via a bus 110.

A system control unit 101 is provided with, for example, a central processing unit (CPU). The system control unit 101 reads a program for controlling operations or processes of the constituent parts provided in the digital camera 100 from a read only memory (ROM) 102, and develops the program in a random access memory (RAM) 103 to execute the program. The ROM 102 is a data rewritable non-volatile memory, and stores not only the program for controlling the operations or processes of the digital camera 100 but also parameters and the like necessary for operations of the constituent parts. The RAM 103 is a data rewritable volatile memory, and is used as a temporary storage area of data output from processes of the digital camera 100.

An imaging optical system 104 allows an imaging unit 105 to form images of light from subjects. The imaging optical system 104 is provided with lenses and an aperture. The imaging unit 105 is provided with an image sensor such as a charge coupled device (CCD) sensor or a complementary metal oxide semiconductor (CMOS) sensor. The image sensor receives light from a subject, performs photoelectric conversion, and thereby acquires an image signal. The imaging unit 105 performs photoelectric conversion on an optical image formed by the imaging optical system 104, and outputs an obtained analog image signal to an analog (A)-digital (D) conversion unit 106. The A-D conversion unit 106 performs an A-D conversion process on the input analog image signal, outputs digital image data to the RAM 103 to be stored therein.

An image processing unit 107 performs various processes on the image data stored in the RAM 103. A recording medium 108 is a detachable memory card, and records data such as images processed by the image processing unit 107 and then stored in the RAM 103 or images A-D converted by the A-D conversion unit 106 as recorded image data. A communication unit 109 transmits image data of the recording medium 108 and the like to the outside through public mobile communication that uses a wireless local area network (LAN), or the like.

Figure 2:
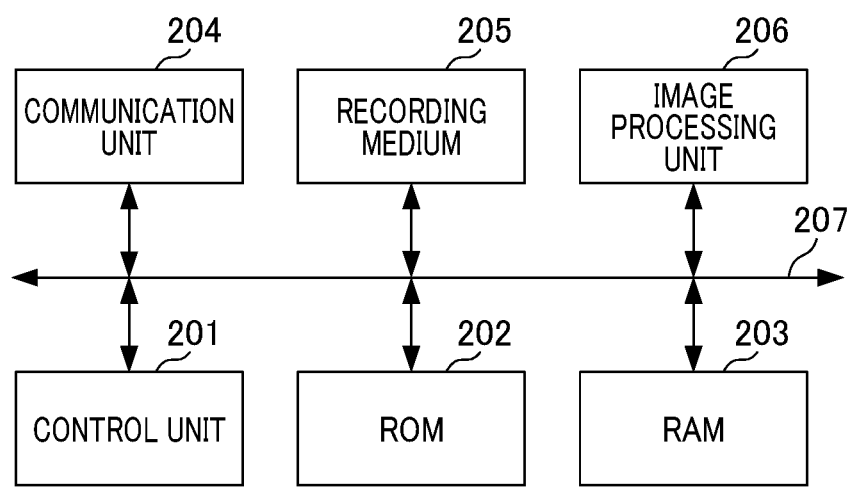
FIG. 2 is a block diagram showing a functional configuration example of an image processing device according to an embodiment of the present invention.

FIG. 2 is a block diagram showing a functional configuration of a PC 200 according to an embodiment of the present invention. Constituent parts thereof can transmit and receive data to and from each other via a bus 207. A control unit 201 having a CPU reads an operation program for each of blocks provided in the PC 200 from a ROM 202, develops the program in a RAM 203 to execute the program. The control unit 201 controls operations of each of the blocks provided in the PC 200. The ROM 202 is a data rewritable non-volatile memory, and stores an operation program for the blocks provided in the PC 200, parameters necessary for the operations of the blocks, and the like. The RAM 203 is a data rewritable volatile memory, and is used as a temporary storage area of data output from processes of the blocks provided in the PC 200.

A communication unit 204 exchanges data with the communication unit 109 of the digital camera 100 of FIG. 1, and receives image data and the like using a wireless LAN or the like. A recording medium 205 is a built-in hard disk, and retains the image data that the communication unit 204 receives, and the like. Recorded image data of the recording medium 205 is developed in the RAM 203, and an image processing unit 206 processes the image data stored in the RAM 203.

FIGS. 3A and 3B exemplify a pixel array of the imaging unit 105 of FIG. 1. FIG. 3A shows a state of the image sensor viewed from the imaging optical system 104 side in the range of vertical 8 rows and horizontal 8 columns. A pixel unit 302 is constituted by a microlens 301 and a pair of photoelectric conversion units 303 and 304. A plurality of pixel units 302 are regularly arrayed in a 2-dimensional array shape in the imaging unit 105 of FIG. 1. FIG. 3B is a diagram showing an enlarged cross-sectional structure of a certain pixel unit 302. Images of light flux that has passed through different pupil areas (different focusing pupil areas) of the imaging optical system 104 of FIG. 1 are respectively formed in the photoelectric conversion units 303 and 304. In the present embodiment, a first image corresponding to an image signal photoelectrically converted by the photoelectric conversion unit 303 will be referred to as an A image, and a second image corresponding to an image signal photoelectrically converted by the photoelectric conversion unit 304 will be referred to as a B image. By adding data of the A image and the B image together, general photographed image data is generated. Note that the direction and the number in which photoelectric conversion units are divided can be arbitrarily changed according to specifications.

Figure 4:
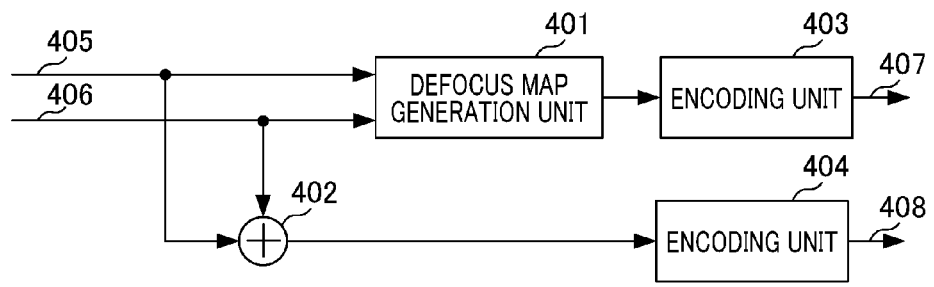
FIG. 4 is a diagram showing a configuration example of an image processing unit of an imaging apparatus according to a first embodiment.

FIG. 4 is a diagram for describing a configuration of the image processing unit 107 of FIG. 1.

A subject image input 405 is input to a defocus map generation unit 401 and an addition unit 402 as an A image signal photoelectrically converted by the photoelectric conversion unit 303 of FIG. 3. In addition, another subject image input 406 is input to the defocus map generation unit 401 and the addition unit 402 as a B image signal photoelectrically converted by the photoelectric conversion unit 304 of FIG. 3.

The defocus map generation unit 401 generates a defocus map showing defocus amount distribution of a subject from the pair of subject images (the A image and the B image). The defocus map is a map with information of distance distribution (depth distribution) of a subjects and the information of the distance distribution of the subject is expressed as defocus amount according to distances (depth) from a camera to the subjects. The generation of the defocus map can be realized using a known technology. A calculation process for detecting an image shift amount based on a degree of matching between the pair of A image signal and B image signal and a conversion process to a defocus amount will be described below in detail.

With the number of pieces of data set as M, data columns corresponding to a pair of A image signal columns read from focus detection pixel columns (pixel columns of the pixel units 302 of FIG. 3) are denoted by $A_1$ to $A_M$, and B image signal columns are denoted by $B_1$ to $B_M$. Through correlation calculation (Sum of Absolute Difference, or SAD) using the following formula (1), a correlation amount $C(k)$ is calculated. The correlation amount $C(k)$ indicates a degree of matching between a pair of subject image signal patterns.

$$C(k) = \Sigma |A_n - B_{n+k}| \quad (1)$$

In formula (1), the $\Sigma$ calculation means computation of the sum of ns. In the $\Sigma$ calculation, the range of n and n+k is limited to the range from 1 to M. In other words, it is limited to the range in which data $A_n$ and $B_{n+k}$ are present according to an image shift amount k. The image shift amount k has an integer value, and is a relative shift amount in unit of the data interval of a pair of data columns corresponding to the signal columns of a pair of subject images.

Figure 12:
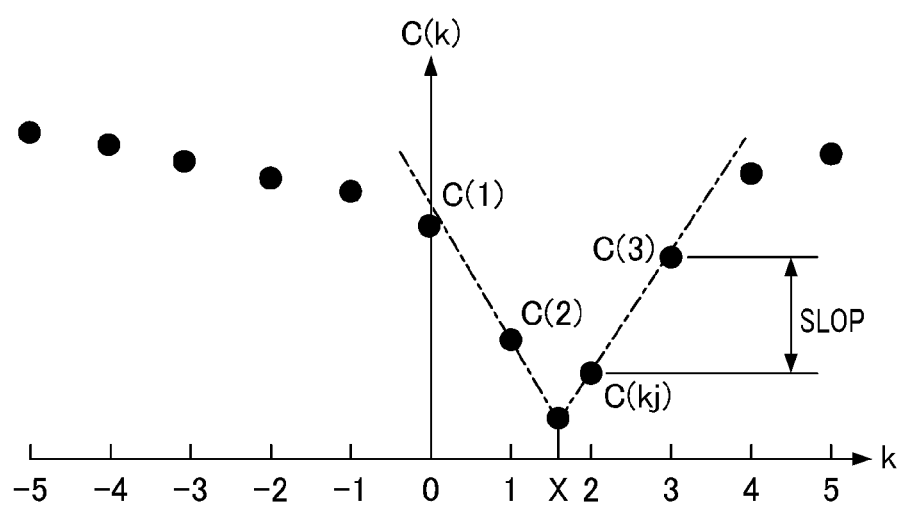
FIG. 12 is an illustrative diagram of a defocus map generation process according to an embodiment of the present invention.

FIG. 12 is a diagram exemplifying calculation results of formula (1) with the horizontal axis representing image shift amount k and the vertical axis representing the correlation amount $C(k)$. As shown in FIG. 12, the correlation amount $C(k)$ has a minimum value at the image shift amount when the correlation of the pair of data columns corresponding to the signal columns of the pair of subject images is high. As the value of the correlation amount $C(k)$ decreases, the degree of correlation of the signal columns of the pair of subject images becomes high, i.e., the degree of matching of the pair of subject image signals increases. In the example of FIG. 12, the correlation amount $C(k)$ has the minimum value when the image shift amount k is 2, i.e., the degree of matching between the pair of subject image signals has a maximum value. If k when the discrete correlation amount $C(k)$ has the minimum value is denoted by kj, kj=2 in the case of FIG. 12.

Since the image shift amount k has an integer value, the correlation amount $C(k)$ has a discrete value. Next, a shift amount x that brings a minimum value $C(x)$ of consecutive correlation amounts is computed through a three-point interpolation process of the following formulas (2) to (5).

$$x = kj + D/\text{SLOP} \quad (2)$$

$$C(x) = C(kj) - |D| \quad (3)$$

$$D = \{C(kj-1) - C(kj+1)\}/2 \quad (4)$$

$$\text{SLOP} = \text{MAX}\{C(kj+1) - C(kj), C(kj-1) - C(kj)\} \quad (5)$$

The shift amount x is converted into a relative image shift amount (denoted by shft) of the pair of subject images. In other words, with the following formula (6), the shift amount x is converted into an image shift amount shft.

$$shft = PY \cdot x \quad (6)$$

In formula (6), a detection pitch PY is a pixel pitch of the pixel units 302 of FIG. 3.

Further, conversion into a defocus amount (denoted by def) is performed by multiplying a predetermined conversion coefficient k by the image shift amount shft computed using formula (6).

$$def = k \cdot shft \quad (7)$$

The conversion coefficient k in formula (7) is a conversion coefficient according to the proportional relation between the gravity center interval of the pair of focusing pupils and the focusing pupil distance of the imaging optical system 104 of FIG. 1, and changes according to the F-number of the aperture.

Because the calculation amount of the correlation amount C(k) of formula (1) increases in proportional to the range of the E calculation and the range of the shift amount, the calculation amount becomes enormous. For this reason, reduction in the number of calculations of the defocus amount, i.e., low resolution (a small size) of the defocus map, aiming at low power consumption is attempted. In the present embodiment, the resolution (the number of pixels) of the pair of subject images is set to 3840×2160 and the resolution (resolving power or the number of samples) of the defocus map is set to 384×216.

The addition unit 402 of FIG. 4 adds the signals of the pair of subject images (the A image and the B image) together. Each of the pair of subject images is an image formed with the light flux that has passed through half the pupil areas in the imaging optical system 104 of FIG. 1. Thus, if the signals of the pair of subject images are added together, subject image information based on the light flux that has passed through the entire pupil areas can be obtained. In the present embodiment, resolution of an addition-processed image is set to 3840×2160, the same as that of the pair of subject images.

An encoding unit 403 acquires defocus map data from the defocus map generation unit 401, and encodes the data using a known encoding technique such as Joint Photographic Experts Group (JPEG). The encoding unit 403 outputs the map data as an encoded defocus map output 407. Another encoding unit 404 acquires addition-processed image data from the addition unit 402, and encodes the data using a known encoding technique such as JPEG. The encoding unit 404 outputs the image data as an encoded image output 408.

Figure 5:
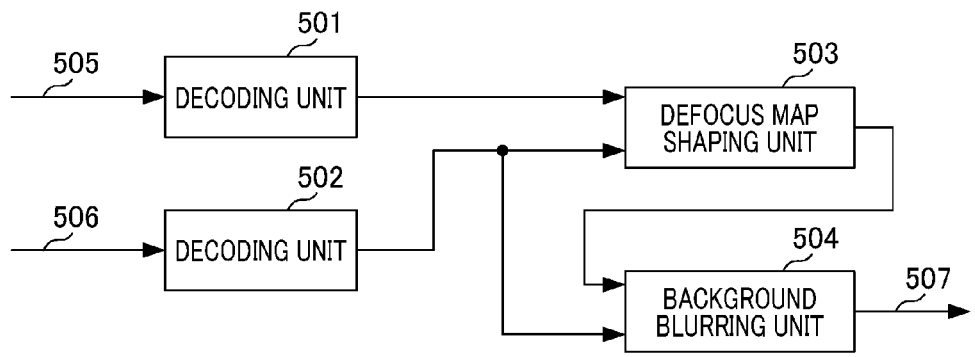
FIG. 5 is a diagram showing a configuration example of an image processing unit of an image processing device according to the first embodiment.

FIG. 5 is a block diagram for describing a configuration example of the image processing unit 206 of FIG. 2. An encoded defocus map input 505 corresponds to the encoded defocus map output 407 of FIG. 4, and an encoded image input 506 corresponds to the encoded image output 408 of FIG. 4.

A decoding unit 501 acquires data of the encoded defocus map input 505, and decodes the encoded defocus map using a known decoding technique such as JPEG. Resolution of the decoded defocus map is, for example, 384×216. The decoded defocus map data that is decoded map data is output to a defocus map shaping unit 503. Another decoding unit 502 acquires data of the encoded image input 506, decodes the encoded image data using a known decoding technique such as JPEG, and thereby generates decoded image data. Resolution of the decoded image is, for example, 3840×2160. The decoded image data is output to the defocus map shaping unit 503 and a background blurring unit 504.

The defocus map shaping unit 503 performs a Joint Bilateral Upsampling (JBU) process as a shaping process on the low-resolution defocus map, referring to a high-resolution image. Accordingly, the contour of the defocus map can be made to have high resolution while it matches the contour of the image. If a filtering result of the position p of a pixel of interest in the JBU process is denoted by Jp, it can be expressed using the following formula (8).

$$Jp = (1/Kp) \Sigma I1q \downarrow \cdot f(|p \downarrow - q \downarrow|) \cdot g(|I2p - I2q|) \quad (8)$$

The meanings of the symbols in formula (8) are as follows.

$q \downarrow$: Position of a peripheral pixel $\Omega$: Integration target region around the position $p \downarrow$ of a pixel of interest $\Sigma$: Integration of the range of $q \downarrow \in \Omega$ $I1 \downarrow$: Signal value of the defocus map at the position $q \downarrow$ of the peripheral pixel $f(|p \downarrow - q \downarrow|)$: Gaussian function for the position $p \downarrow$ of the pixel of interest I2p: Pixel value of a shaping image at the position p of a pixel of interest I2q: Pixel value of a shaping image at the position q of a peripheral pixel $g(|I2p - I2q|)$: Gaussian function for the pixel value I2p of the shaping image Kp: Normalization coefficient and the integrated value of weights of f and g If the difference between I2p of the position p of the pixel of interest and I2q of position q of the peripheral pixel is small, i.e., if the pixel values of the pixel of interest and the peripheral pixel are close in the shaping image, the weights of f and g (a weight of smoothing) of the peripheral pixel increases.

The position $p \downarrow$ of the pixel of interest and the position $q \downarrow$ of the peripheral pixel are expressed in a coordinate system of the low-resolution defocus map (384×216). The position p of the pixel of interest and the position q of the peripheral pixel are expressed in a coordinate system of the high-resolution image (3840×2160). The filtering result Jp of the JBU process is calculated in the coordinate system of the image, and is output to the background blurring unit 504 as data having the same resolution as the resolution (3840×2160) of the image. In the present embodiment, a background blurring process will be described as an example of image processing.

The background blurring unit 504 adds blur on the image with reference to the shaping-processed defocus map. The background blurring unit 504 thereby obtains data of an image output 507 whose background is blurred. Output resolution of the image output 507 is 3840×2160, the same as the input resolution.

Figure 6:
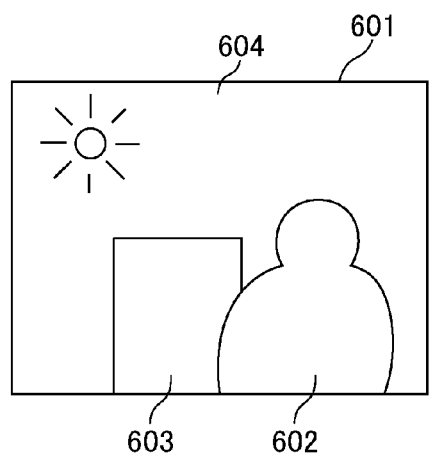
FIG. 6 is a diagram for describing an operation of the imaging apparatus according to the first embodiment.
Figure 7A:
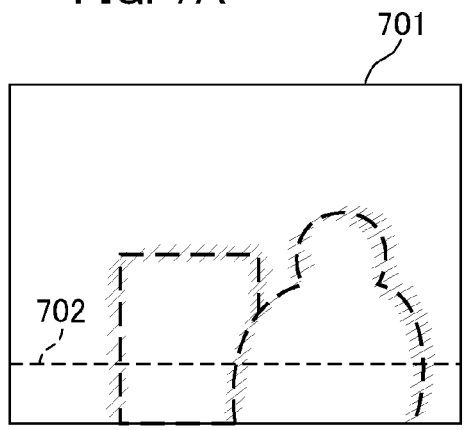
FIGS. 7A and 7B are diagrams for describing an operation of the image processing unit of the imaging apparatus according to the first embodiment.
Figure 7B:
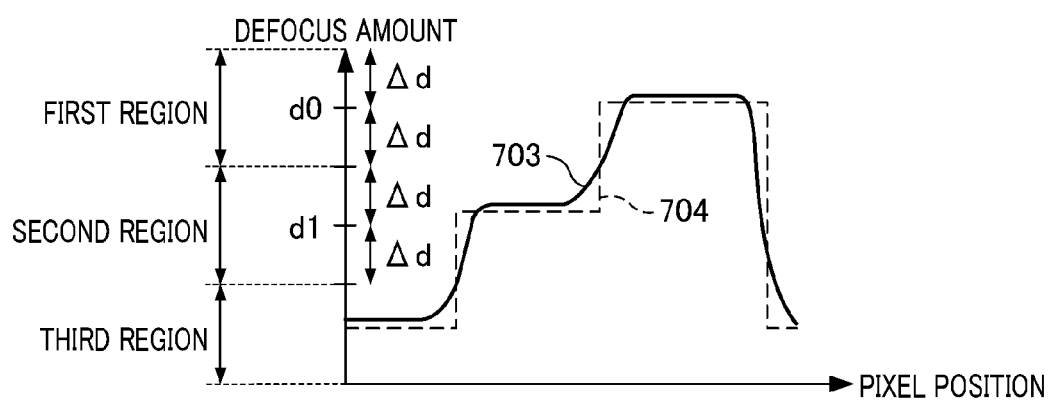

An operation of the defocus map shaping unit 503 and the background blurring unit 504 of FIG. 5 will be described with reference to FIGS. 6, 7A and 7B. FIG. 6 exemplifies a resolution image 601. A main subject 602 and its backgrounds 603 and 604 are shown as subjects at different distances. FIG. 7A exemplifies a low-resolution defocus map 701 before the shaping process. FIG. 7B shows a part of the low-resolution defocus map 701 with the horizontal axis representing pixel positions and the vertical axis representing defocus amounts. A graph line 703 indicated by the solid line in FIG. 7B expresses horizontal distribution of defocus amounts of a line 702 indicated by the dashed line in FIG. 7A. On the vertical axis of FIG. 7B, a defocus amount d0 is set to 0, defocus amounts of backgrounds are set to negative values, and defocus amounts of foregrounds are set to positive values.

In a defocus map generation process, the calculation of formula (1) is performed over a predetermined range, and thus output defocus amounts gently change in the predetermined range. Therefore, the defocus horizontal distribution of FIG. 7B (see the graph line 703) does not radically change along with the contour of the subjects, and the actual contour of the subjects are not exactly expressed. As a result, the contours of the main subject 602 and the background 603 of FIG. 6 become dull. On the other hand, since the defocus map does not radically change in terms of space, deterioration caused by encoding is little.

The graph line 704 indicated by the dashed line in FIG. 7B indicates a part of the high-resolution defocus map shaped by the defocus map shaping unit 503 of FIG. 5, exemplifying horizontal distribution of the defocus amounts. Even though the image that is referred to during shaping is affected by deterioration caused by encoding, the image has higher resolution than that of the defocus map and thus its deterioration is little, and thus it is possible to reduce deterioration of the contour of the subject on a shaped high-resolution defocus map.

The background blurring unit 504 of FIG. 5 performs the following processes with reference to the shaping-processed defocus map. In FIG. 7B, the ranges of first to third regions that are divided into Δd of the vertical axis with reference to d0 and d1 are shown.

Not adding blur to the image in the first region in which the defocus amount is (d0+Δd) to (d0−Δd).

Adding blur of a defocus amount d1 to the image in the second region in which the defocus amount is (d1+Δd) to (d1−Δd).

Adding infinite blur to the image in the third region in which the defocus amount is less than (d1−Δd).

The blur adding process is realized with a 2-dimensional filtering process, and a filtering coefficient BRF (x, y) is expressed by formula (9). (x, y) indicates 2-dimensional coordinates set in the image, and the value of 1 or 0 is decided with r as a threshold value.

$$BRF(x,y)=1 \text{ if } \sqrt{(x^2+y^2)} \leq r$$

$$BRF(x,y)=0 \text{ if } \sqrt{(x^2+y^2)} > r \quad (9)$$

In the present embodiment, the value r of a blur filtering coefficient of the defocus amount d1 is set to r1 and the value r of an infinite blur filtering coefficient is set to r2 (>r1). In this setting, small blur with r1 can be added to an image of a background subject having a small defocus amount, and large blur with r2 can be added to an image of an infinite background subject having a large defocus amount.

In the defocus map generation process, it is not possible to acquire a defocus map with the correct contour of subjects due to constraint of the E calculation of formula (1). For this reason, it is necessary in the shaping process of the defocus map to adjust the contour of a subject to the correct contour (to the contour of the shaping image).

In encoding after the shaping of the defocus map, if the shaped defocus map with the same resolution of 3840×2160 as that of the image is generated, the scale of calculation of the shaping process of the defocus map becomes great. As a result, it is difficult to achieve low power consumption of the digital camera 100. In addition, when a shaped defocus map is generated to have the original resolution of the defocus map, 384×216, the influence of deterioration caused by encoding the shaped contour part of subjects increases.

Since the shaping process of the defocus map is performed after decoding in the present embodiment, it is possible to reduce the influence of the encoding on the defocus map while power consumption of the digital camera 100 is suppressed. Note that, although the application example with respect to the image processing system having separate bodies of the RGB-D camera and the image processing device has been described in the present embodiment, the present invention is not limited thereto, and may be applied to an RGG-D camera having an image processing function. This also applies to embodiments to be described below.

In addition, in the present embodiment, the defocus map is computed as information of distance distribution of subjects, and this map data is used. Without being limited thereto, data obtained by converting each defocus amount of the above-described embodiment into a subject distance (distance to a subject in a depth direction) and set it on a distance map may be used. Similarly, application of such data to a distance map indicating distance distribution of subjects also is possible in the embodiments below.

Second Embodiment

Next, a second embodiment of the present invention will be described. In the present embodiment, detailed description of similar constituent parts as those of the first embodiment will be omitted by using the reference numerals and symbols used above, and differences will be mainly described. Omission of the description will also be applied to the following embodiment.

Figure 8:
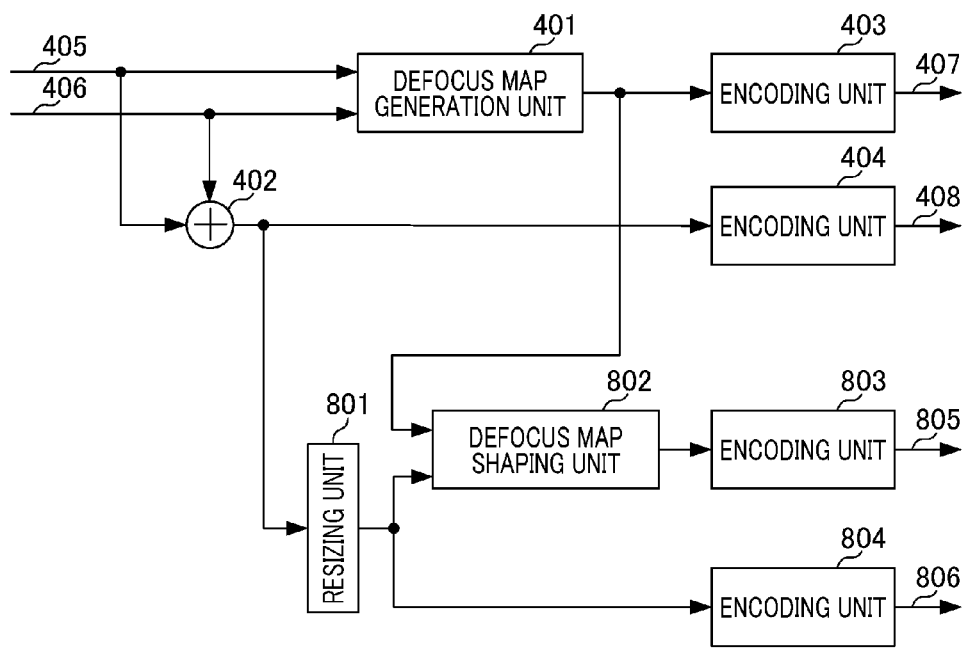
FIG. 8 is a diagram showing a configuration example of an image processing unit of an imaging apparatus according to a second embodiment.

FIG. 8 is a block diagram for describing a configuration of an image processing unit 107 according to the present embodiment. Reference numerals 401 to 408 are as described in the first embodiment using FIG. 4. Output resolution of a defocus map generation unit 401 is 384×216, and output resolution of the addition unit 402 is 3840×2160.

A resizing unit 801 acquires image data output by the addition unit 402, and resizes the data for preview. Output resolution of the resizing unit 801 is set to 960×540. A defocus map shaping unit 802 acquires each of the output data of the defocus map generation unit 401 and the resizing unit 801, and performs a shaping process for preview. The process is the same as that of the defocus map shaping unit 503 of FIG. 5, and output resolution thereof is set to 960×540 that is the same as that of the image for preview. The shaping-processed defocus map is output to an encoding unit 803.

The encoding unit 803 encodes the defocus map for preview. The encoded map data serves as data of an encoded defocus map output 805 for preview. Another encoding unit 804 acquires the output data of the resizing unit 801, and encodes the image for preview. The encoded image data serves as data of an encoded image output 806 for preview.

Figure 9A:
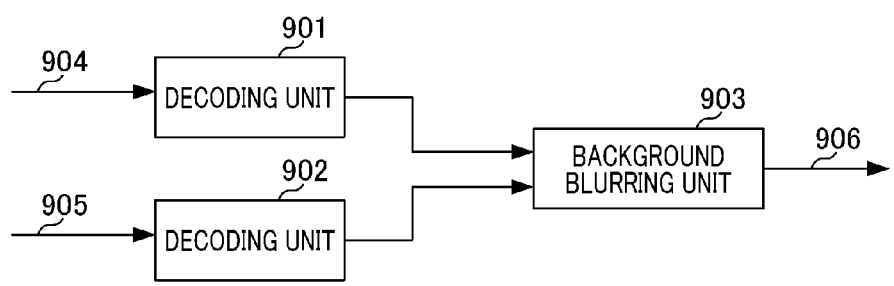
FIGS. 9A and 9B are diagrams showing configuration examples of image processing units of an image processing device according to the second embodiment.
Figure 9B:
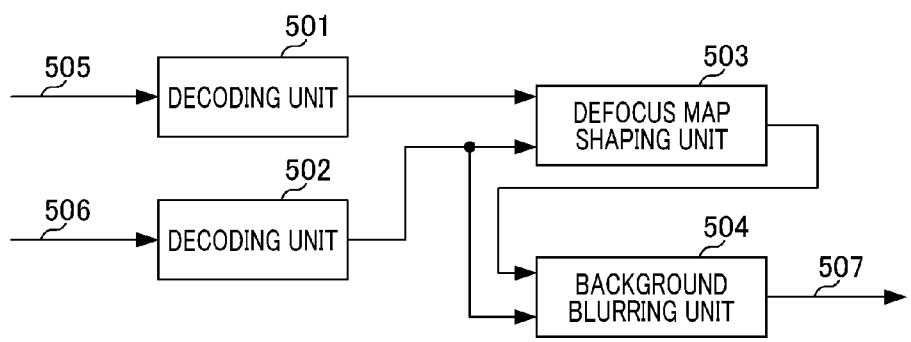

FIGS. 9A and 9B are block diagrams for describing a configuration of an image processing unit 206 according to the present embodiment. Reference numerals 501 to 507 shown in FIG. 9B are as described in the first embodiment using FIG. 5. Output resolution of the background blurring unit 504 is 3840×2160. An encoded defocus map input 904 for preview corresponds to the encoded defocus map output 805 of FIG. 8, and an encoded image input 905 for preview corresponds to the encoded image output 806 of FIG. 8.

A decoding unit 901 of FIG. 9A acquires data of the encoded defocus map input 904 for preview, and decodes the encoded defocus map for preview. The decoded map data (defocus map data) is output to a background blurring unit 903 for preview. Another decoding unit 902 acquires data of the encoded image input 905 for preview and decodes the encoded image for preview. The decoded image data is output to the background blurring unit 903 for preview.

The background blurring unit 903 executes a blurring process similarly to the background blurring unit 504 of FIG. 5. Output resolution of the background blurring unit 903 is 960×540. The data of a background-blurred image output 906 for preview is sent to a display unit and its image is displayed on a screen thereof.

The PC 200 of FIG. 2 ensures rapidity in a process that requires a prompt image display such as a preview by using a defocus map shaped by the digital camera 100 of FIG. 1. In addition, performance of the PC 200 of FIG. 2 for image quality is ensured in a process that requires high image quality such as a recording process of captured image data by shaping a defocus map.

According to the present embodiment, it is possible to select an optimum map data with regard to distance distribution of subjects according to purposes.

Third Embodiment

Next, a third embodiment of the present invention will be described.

Figure 10:
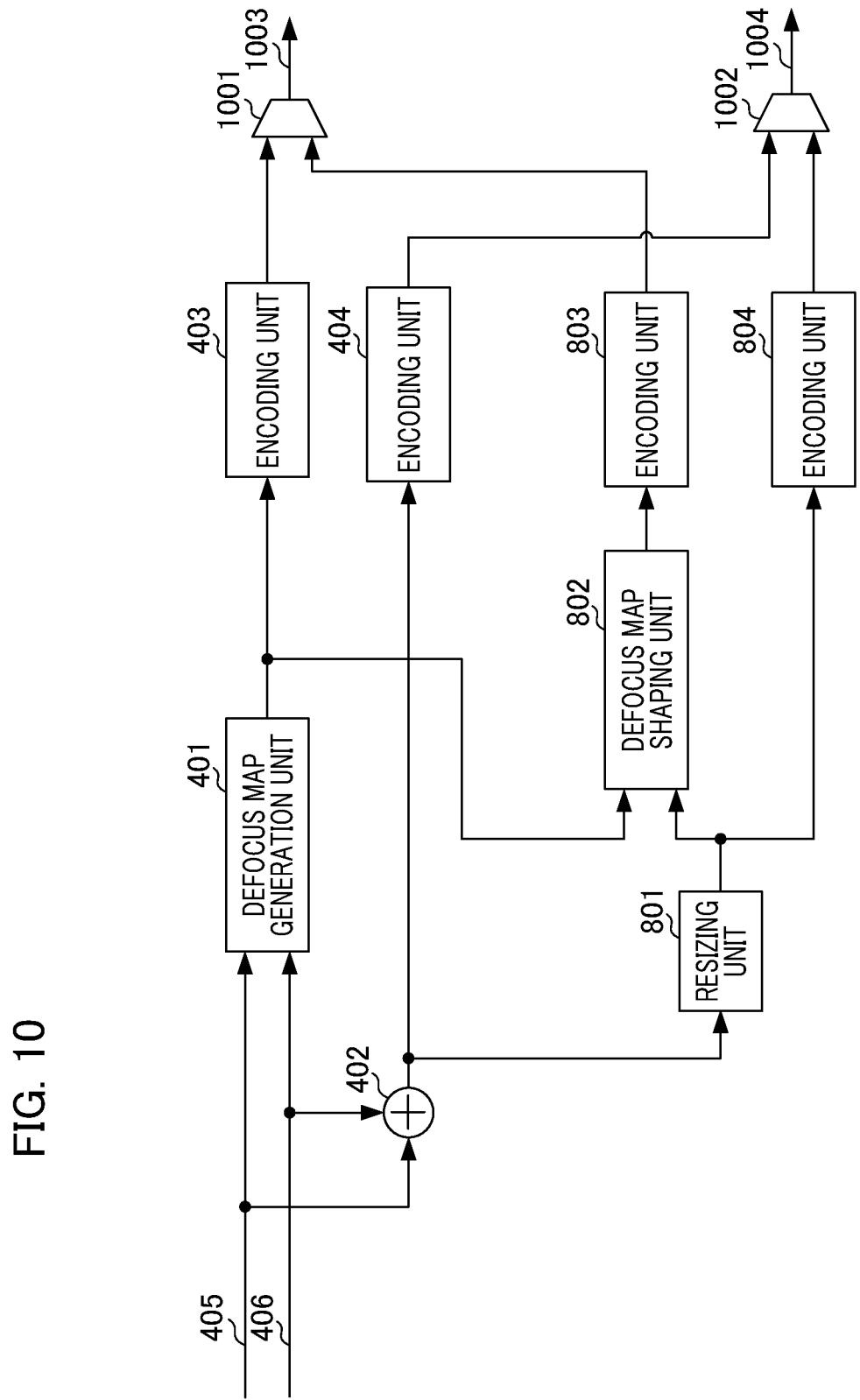
FIG. 10 is a diagram showing a configuration example of an image processing unit of an imaging apparatus according to a third embodiment.

FIG. 10 is a block diagram for describing a configuration of an image processing unit 107 of the present embodiment. The reference numerals 401 to 406 are as described in the first embodiment using FIG. 4. The output resolution of the defocus map generation unit 401 is 384×216, and the output resolution of the addition unit 402 is 3840×2160. In addition, reference numerals 801 to 804 are as described in the second embodiment using FIG. 8. The output resolution of the resizing unit 801 and the defocus map shaping unit 802 is 960×540.

An encoded defocus map selection unit 1001 selects the output of the encoding unit 403 or the output of the encoding unit 803, and sets the output as an encoded defocus map output 1003. An encoded image selection unit 1002 selects the output of the encoding unit 404 or the output of the encoding unit 804, and sets the output as an encoded image output 1004.

Figure 11:
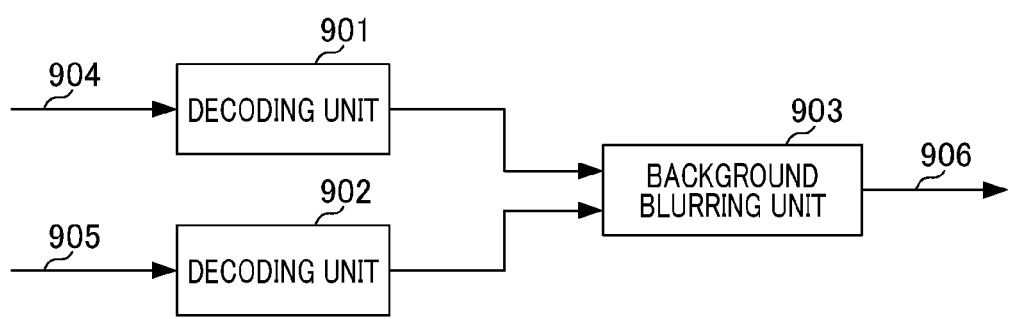
FIG. 11 is a diagram showing a configuration example of an image processing unit of an image processing device according to the third embodiment.

FIG. 11 is a block diagram for describing an example of a configuration of an image processing unit 206 according to the present embodiment. Reference numerals 901 to 906 are as described in the second embodiment using FIG. 9. Output resolution of the background blurring unit 903 is 960×540.

If the image processing device of FIG. 2 is a tablet PC with a low processing capacity, the image processing unit 206 has the configuration of FIG. 11. In addition, if the image processing device of FIG. 2 is a desktop PC with a high processing capacity, the image processing unit 206 has the configuration of FIG. 5. The system control unit 101 of the digital camera of 100 of FIG. 1 has a function of identifying an apparatus serving as a data transmission destination. If the image processing device of FIG. 2 that is an apparatus serving as a data transmission destination is a table PC, the digital camera 100 transmits the following data.

Data of a shaped defocus map (with resolution of 960×540) as an encoded defocus map. In other words, the encoded defocus map selection unit 1001 selects the output of the encoding unit 803.
  Data of a resized image (with resolution of 960×540) as an encoded image. In other words, the encoded image selection unit 1002 selects the output of the encoding unit 804.

On the other hand, if the image processing device of FIG. 2 serving as a data transmission destination is a desktop PC, the digital camera 100 transmits the following data.

Data of a defocus map that has not been processed for shaping (with the resolution of 384×216) as an encoded defocus map. In other words, the encoded defocus map selection unit 1001 selects the output of the encoding unit 403.
  Data of an image that has not been processed for resizing (with the resolution of 3840×2160) as an encoded image. In other words, the encoded image selection unit 1002 selects the output of the encoding unit 404.

If the image processing device is a desktop PC, the image processing unit 206 of FIG. 2 acquires data of a defocus map that has not been processed for shaping (with the resolution of 384×216), and generates data of a shaped defocus map (with the resolution of 3840×2160).

Since the digital camera 100 transmits a shaped defocus map if the processing capacity of the image processing device serving as a data transmission destination is low, rapidity of the image processing device can be ensured. In addition, if the processing capacity of the image processing device serving as a data transmission destination is high, a non-shaped defocus map is transmitted and then the image processing device executes a shaping process on the defocus map. Accordingly, performance of the image processing device for image quality can be ensured. According to the present embodiment, it is possible to generate an optimum defocus map according to a processing capacity of the image processing device.

In addition, in an application example of an RGB-D camera equipped with an image processing function, a method for generating a defocus map is not switched according to a processing capacity of an image processing device serving as a data transmission destination, but is switched according to a photographing mode. In other words, when required resolution is low in a social networking service (SNS) sharing mode or the like, the digital camera 100 encodes a shaped defocus map during photographing. Thereby, rapidity at the time of SNS uploading can be ensured. In addition, when required resolution is high in a photo printing mode or the like, the digital camera 100 decodes a non-shaped defocus map and shapes the defocus map when there is enough time for photo-printing. Therefore, performance for image quality can be ensured.

Although exemplary embodiments of the present invention have been described above, the present invention is not limited to the embodiments, and can be variously modified and changed within the scope of the gist.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128534, filed Jun. 26, 2015, which is hereby incorporated by reference wherein in its entirety.

What is claimed is:

1. An image processing device that processes image data and map data with regard to depth distribution of a subject, the image processing device comprising:
   at least one processor or at least one circuit programmed to function as:
   a first decoding unit configured to decode the image data that has been encoded and thereby generate decoded image data;
   a second decoding unit configured to decode the map data that has been encoded and thereby generate decoded map data;
   a first shaping unit configured to perform a shaping process of the decoded map data with reference to the decoded image data, wherein the shaping process includes an edge-preserved filtering process using coefficients generated based on the decoded image data; and
   a first image processing unit configured to perform image processing to the decoded image data with reference to the decoded map data that has been processed for shaping by the first shaping unit.

2. The image processing device according to claim 1, wherein the first shaping unit perform the shaping process to the decoded map data with reference to the decoded image data having higher resolution than that of the decoded map data.

3. The image processing device according to claim 1, wherein:
   the at least one processor or at least one circuit is further programmed to function as a second shaping unit configured to acquire the map data that has not been encoded and perform a shaping process to the data,
   wherein the first shaping unit refers to the decoded image data having first resolution to shape the decoded map data and outputs map data having the first resolution, and
   wherein the second shaping unit refers to image data having second resolution that is lower than the first resolution to shape the map data and outputs map data having the second resolution.

4. The image processing device according to claim 3, wherein:
   the at least one processor or at least one circuit is further programmed to function as a map generation unit configured to generate the map data that has not been encoded and output the data to the second shaping unit.

5. The image processing device according to claim 3, wherein the at least one processor or at least one circuit is further programmed to function as:
   a third decoding unit configured to decode the image data that has been encoded and thereby generate decoded image data;
   a fourth decoding unit configured to decode the map data that has been processed for shaping by the second shaping unit and then encoded, and thereby generate decoded map data; and
   a second image processing unit configured to perform image processing to the decoded image data generated by the third decoding unit with reference to the decoded map data generated by the fourth decoding unit.

6. The image processing device according to claim 5, wherein the first image processing unit performs image processing to the decoded image data with reference to the decoded map data having the first resolution, and wherein the second image processing unit performs image processing to the decoded image data with reference to the decoded map data having the second resolution.

7. The image processing device according to claim 6, wherein the first or the second image processing unit performs a process of blurring a background image.

8. The image processing device according to claim 1, wherein the at least one processor or at least one circuit is further programmed to function as:
   a first encoding unit configured to encode the image data and output the data to the first decoding unit; and
   a second encoding unit configured to encode the map data and output the data to the second decoding unit.

9. The image processing device according to claim 5, wherein the at least one processor or at least one circuit is further programmed to function as:
   a first encoding unit configured to encode the image data and output the data to the first decoding unit;
   a second encoding unit configured to encode the map data and output the data to the second decoding unit;
   a third encoding unit configured to encode the image data and output the data to the third decoding unit; and
   a fourth encoding unit configured to encode the map data that has been processed for shaping by the second shaping unit and output the data to the fourth decoding unit.

10. The image processing device according to claim 3, wherein the at least one processor or at least one circuit is further programmed to function as:
    a resizing unit configured to resize the image data,
    wherein the second shaping unit acquires image data that has been processed for resizing by the resizing unit and perform a shaping process to the map data.

11. The image processing device according to claim 9, wherein the at least one processor or at least one circuit is further programmed to function as:
    a first selection unit configured to select and output the map data encoded by the second encoding unit or the fourth encoding unit; and
    a second selection unit configured to select and output the image data encoded by the first encoding unit or the third encoding unit.

12. The image processing device according to claim 3, wherein the at least one processor or at least one circuit is further programmed to function as:
   a first encoding unit configured to encode the image data and output the data to the first decoding unit; and
   a second encoding unit configured to encode the map data that has not been shaped by the second shaping unit and output the data to the second decoding unit.

13. The image processing device according to claim 1, wherein, when the pixel value of a pixel of interest and the pixel value of a peripheral pixel of the foregoing pixel are to be smoothed with respect to the pixel of interest of the map data, the first shaping unit increases a weight of smoothing for an output of the peripheral pixel as the pixel value of the pixel of interest gets closer to the pixel value of the peripheral pixel.

14. The image processing device according to claim 1, wherein the shaping process includes a Joint Bilateral process.

15. An image processing system comprising:
   at least one processor or at least one circuit programmed to function as an encoding device and a decoding device,
   wherein the encoding device comprising:
      a first encoding unit configured to encode image data; and
      a second encoding unit configured to encode map data with regard to depth distribution of a subject, and
   wherein the decoding device comprising:
      a first decoding unit configured to decode the image data encoded by the first encoding unit and thereby generate decoded image data;
      a second decoding unit configured to decode the map data encoded by the second encoding unit and thereby generate decoded map data;
      a first shaping unit configured to perform a shaping process to the decoded map data with reference to the decoded image data having higher resolution than that of the decoded map data, wherein the shaping process includes an edge-preserved filtering process using coefficients generated based on the decoded image data; and
      a first image processing unit configured to perform image processing to the decoded image data with reference to the decoded map data that has been processed for shaping by the first shaping unit.

16. The image processing system according to claim 15, wherein the encoding device further comprising:
   a second shaping unit configured to perform a shaping process to the map data that has not been encoded,
   wherein the first shaping unit refers to the decoded image data having first resolution to shape the decoded map data and output map data having the first resolution, and
   wherein the second shaping unit refers to image data having second resolution that is lower than the first resolution to shape the map data and output map data having the second resolution.

17. The image processing system according to claim 16, wherein, when the pixel value of a pixel of interest and the pixel value of a peripheral pixel of the pixel are to be smoothed with respect to the pixel of interest of the map data, the first or the second shaping unit increases a weight of smoothing for an output of the peripheral pixel as the pixel value of the pixel of interest gets closer to the pixel value of the peripheral pixel.

18. The image processing system according to claim 16, wherein the encoding device further comprising:
   a third encoding unit configured to encode the image data; and
   a fourth encoding unit configured to encode the map data that has been processed for shaping by the second shaping unit, and
   wherein the decoding device further comprising:
      a third decoding unit configured to decode the image data encoded by the third encoding unit and thereby generate decoded image data; and
      a fourth decoding unit configured to decode the map data encoded by the fourth encoding unit and thereby generate decoded map data.

19. The image processing system according to claim 18, wherein the decoding device further comprising:
   a second image processing unit configured to perform image processing to the decoded image data generated by the third decoding unit with reference to the decoded map data generated by the fourth decoding unit.

20. The image processing system according to claim 19, wherein the first image processing unit performs image processing to the decoded image data with reference to the decoded map data having first resolution, and
   wherein the second image processing unit performs image processing to the decoded image data with reference to the decoded map data having second resolution that is lower than the first resolution.

21. An imaging apparatus that includes an image processing device that processes image data and map data with regard to depth distribution of a subject,
   wherein the image processing device comprising at least one processor or at least one circuit programmed to function as:
      a first decoding unit configured to decode the image data that has been encoded and thereby generate decoded image data;
      a second decoding unit configured to decode the map data that has been encoded and thereby generate decoded map data;
      a first shaping unit configured to perform a shaping process to the decoded map data with reference to the decoded image data having higher resolution than that of the decoded map data, wherein the shaping process includes an edge-preserved filtering process using coefficients generated based on the decoded image data; and
      a first image processing unit configured to perform image processing to the decoded image data with reference to the decoded map data that has been processed for shaping by the first shaping unit.

22. The imaging apparatus according to claim 21, comprising:
   an image sensor configured to image a subject through an imaging optical system,
   wherein the image sensor has a plurality of photoelectric conversion units that receive light that has passed through each of different pupil areas of the imaging optical system, and acquires information of depth distribution of a subject from a signal output by the plurality of photoelectric conversion units.

23. An image processing method implemented by an image processing device that processes image data and map data of depth distribution of a subject, comprising:
   first decoding of decoding the image data that has been encoded and thereby generating decoded image data;

second decoding of decoding the map data that has been encoded and thereby generating decoded map data;

shaping by performing a shaping process to the decoded map data with reference to the decoded image data, wherein the shaping process includes an edge-preserved filtering process using coefficients generated based on the decoded image data; and image processing of performing image processing to the decoded image data with reference to the decoded map data that has been processed for shaping in the shaping.

24. A non-transitory recording medium in which a program for causing a computer of the image processing device to implement each step of an image processing method is recorded, the image processing method comprising:

first decoding of decoding the image data that has been encoded and thereby generating decoded image data;

second decoding of decoding the map data that has been encoded and thereby generating decoded map data;

shaping by performing a shaping process to the decoded map data with reference to the decoded image data, wherein the shaping process includes an edge-preserved filtering process using coefficients generated based on the decoded image data; and image processing of performing image processing to the decoded image data with reference to the decoded map data that has been processed for shaping in the shaping.

25. The image processing device according to claim 1, wherein the map data recorded by the second decoding unit is not performed by the shaping process before decoding.

\* \* \* \* \*